Sept. 7, 1954   L. LEE II   2,688,229
FUEL AND SPEED CONTROL FOR INTERNAL-COMBUSTION ENGINES
Filed July 30, 1948   3 Sheets-Sheet 1
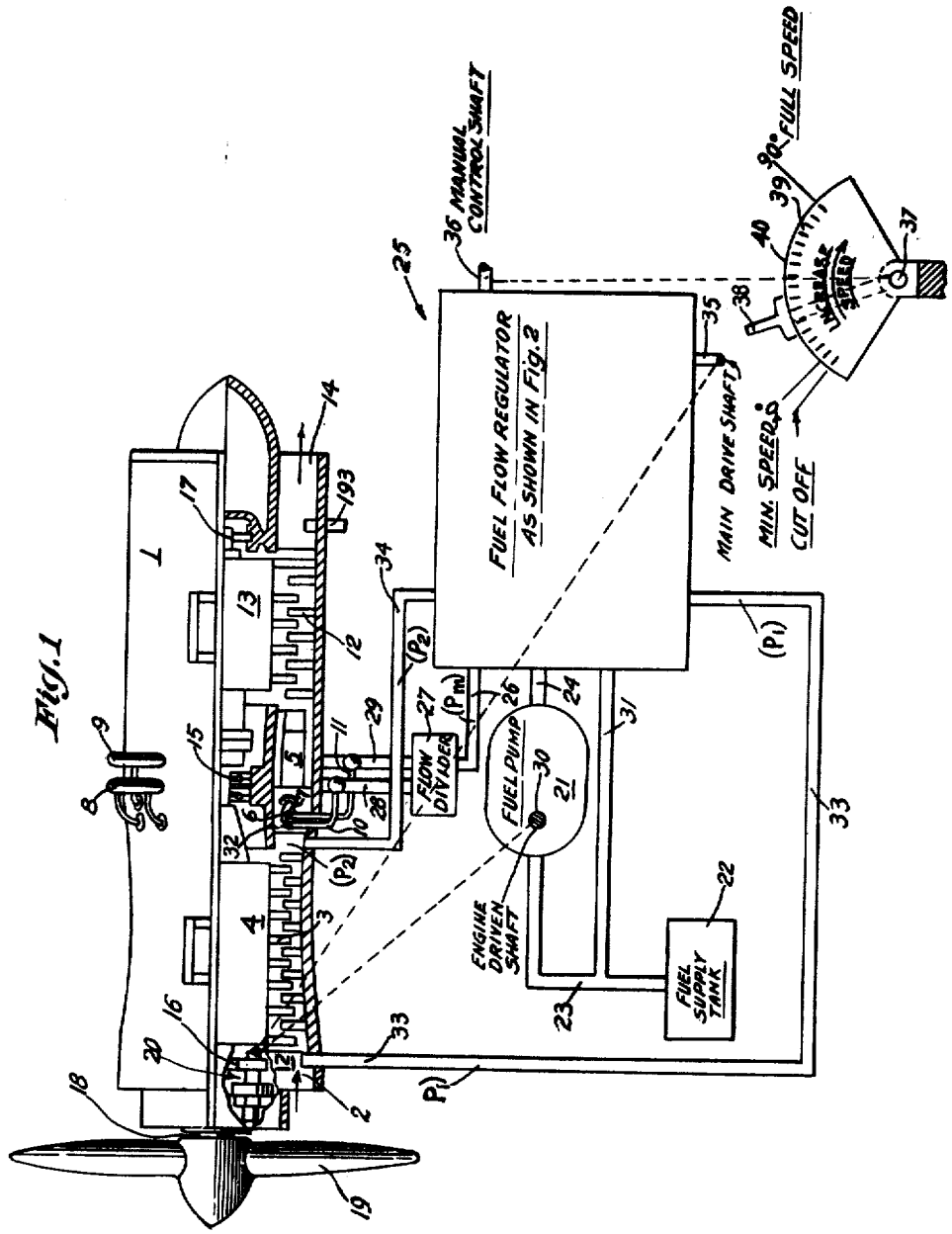
INVENTOR
Leighton Lee II
BY
ATTORNEY

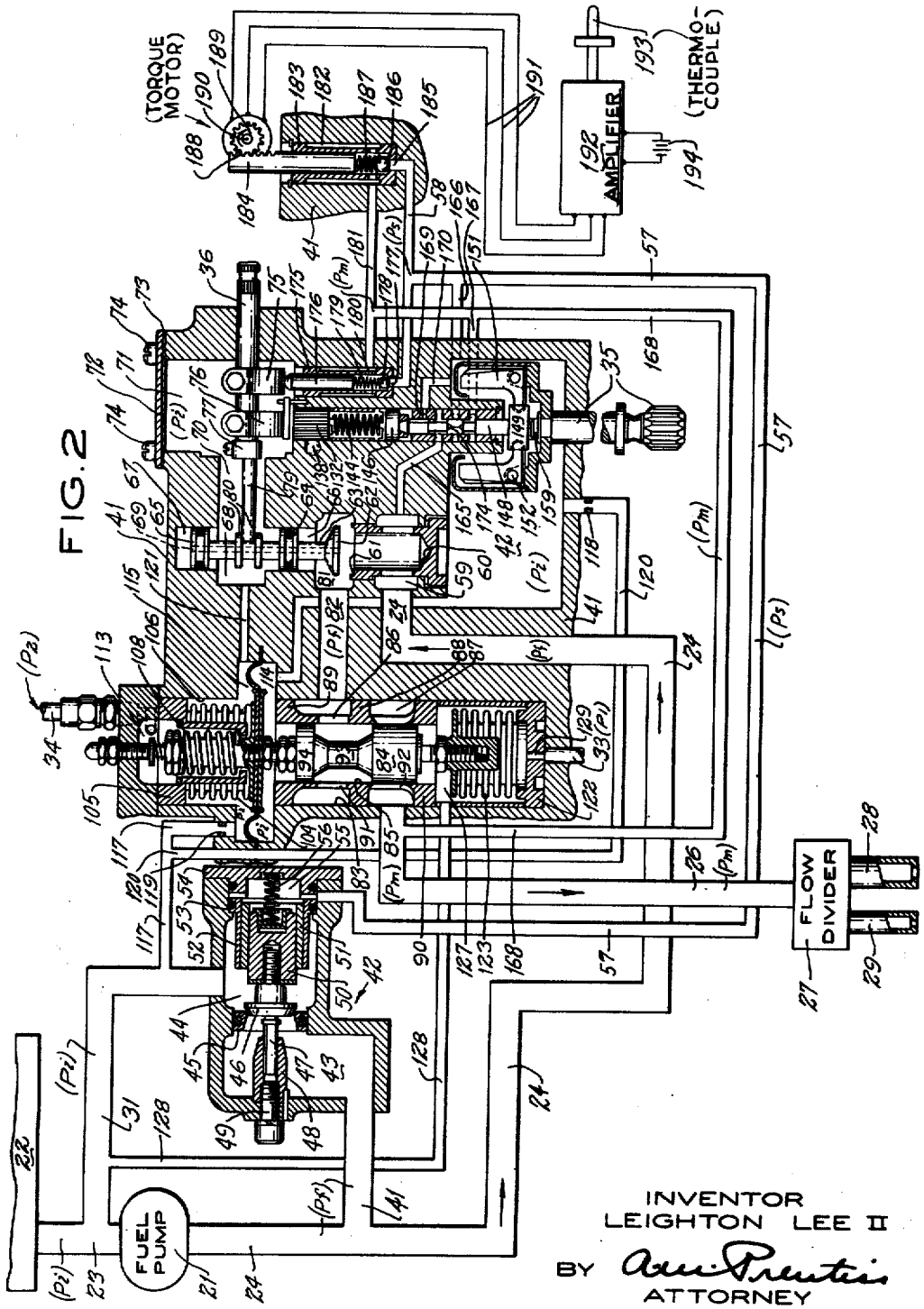

Sept. 7, 1954     L. LEE II     2,688,229
FUEL AND SPEED CONTROL FOR INTERNAL-COMBUSTION ENGINES
Filed July 30, 1948     3 Sheets-Sheet 3
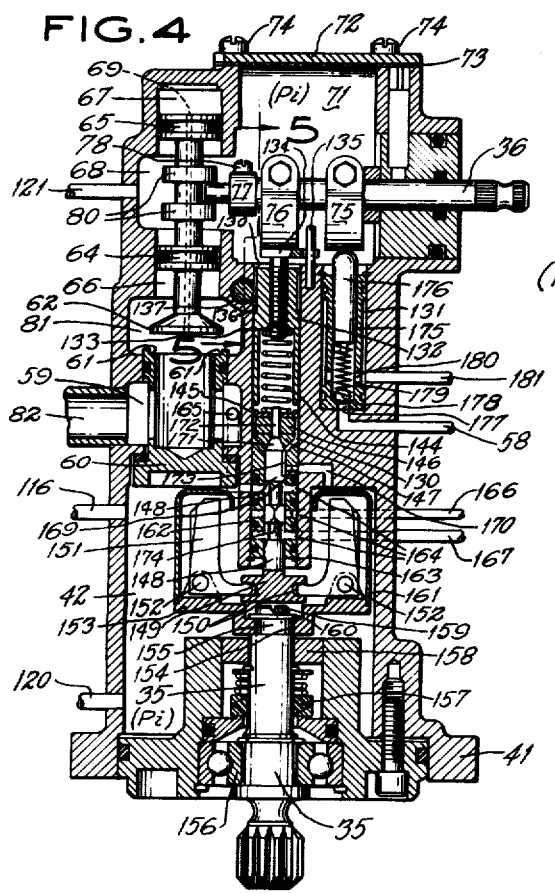
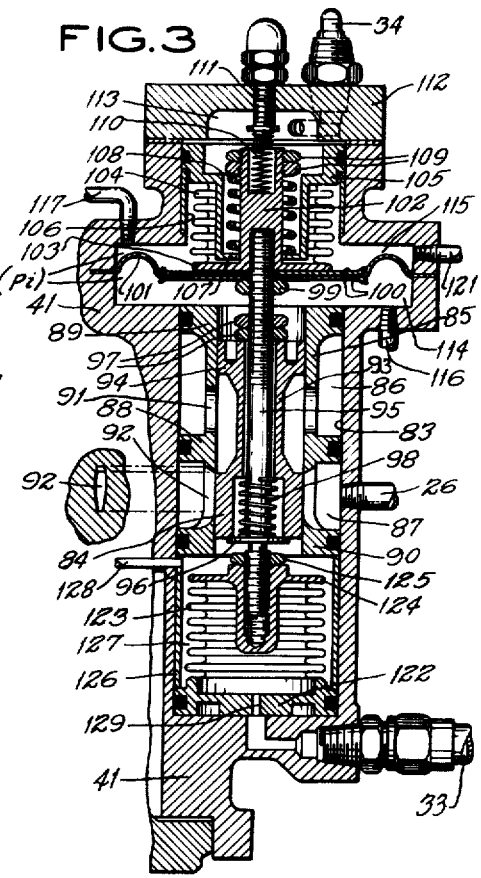
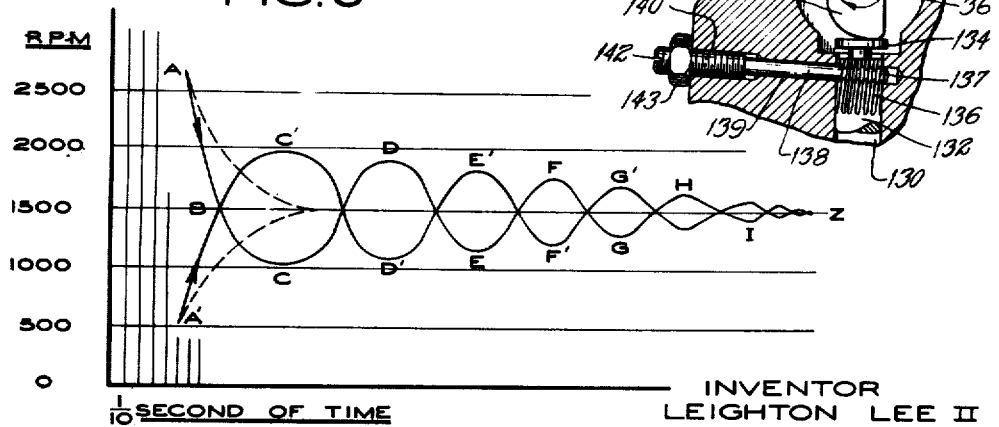
INVENTOR
LEIGHTON LEE II
BY *Ann Prentiss*
ATTORNEY / Patented Sept. 7, 1954

2,688,229

UNITED STATES PATENT OFFICE 2,688,229

FUEL AND SPEED CONTROL FOR INTERNAL-COMBUSTION ENGINES

Leighton Lee II, Rocky Hill, Conn., assignor to Niles-Bement-Pond Company, West Hartford, Conn., a corporation of New Jersey Application July 30, 1948, Serial No. 41,632

34 Claims. (Cl. 60—39.28)

This invention pertains to automatic control apparatus for internal combustion engines and more particularly has reference to controls for internal combustion engines of the gas turbine and jet types.

My invention is especially applicable to internal combustion engines for propeller-propulsion jet-propulsion (turbo-jet), or propeller-and-jet (prop-jet) propulsion of aircraft. Such engines usually include an air inlet, an air compressor, one or more combustion chambers, a gas turbine, and a tail pipe for discharging combustion gases to the atmosphere, except that ram-jet engines have no air compressor or gas turbine. Associated with these engines is a fuel system including a pump for delivering fuel to the combustion chambers. This invention concerns apparatus to control the engine speed and power by controlling the fuel supply as a function of several variables, including engine speed, engine temperature, and other engine operating conditions, and a manual control.

Owing to structural and metallurgical limitations, engines of the type referred to cannot be safely operated at speeds and temperatures exceeding predetermined limiting values, but for maximum economy of operation, both speed and temperature of engine must be maintained at or near these limiting values. On the other hand, while engine speed is a critical factor in flight performance of aircraft, an engine cannot be operated at maximum speed in all flight maneuvers, at all flight speeds, or under all flight conditions. Fuel control apparatus should also enable the operator to vary engine speed as desired from a minimum required power to the predetermined limit of speed and full power. The control of engine temperature is preferably an automatic function of the fuel control apparatus.

The value of engine speed corresponding to any given value of fuel flow, varies as a function of the altitude of flight, flight speed, air density at the engine air inlet, engine torque, fuel quality and a wide variety of other factors. For precise regulation of engine speed or to avoid excessive temperatures, it is therefore not feasible to rely solely upon automatic regulation of fuel flow as a function of variables which exclude engine speed and temperature.

Heretofore it has been proposed to control engine performance by regulating the fuel supply to the engine by means of a regulator, in the form of a self-contained unit running on its own fluid, which produces an hydraulic pressure that is transmitted to a variable delivery fuel pump so designed that its delivery varies in a desired relationship to the transmitted pressure. Such a control apparatus was disclosed in my application, Serial No. 746,975, filed May 9, 1947, now Patent No. 2,675,674, and assigned to the same assignee as this application. Recent experience in operating aircraft under conditions of very low temperatures has shown that better engine performance can be obtained if the fuel control works directly on the fuel supplied to the engine rather than on the fuel pump. Accordingly, the new type of fuel control herein disclosed is devised to function directly on the fuel supply and is, not only capable of performing the functions of the apparatus disclosed in my prior application, cited, but also has some advantages not offered by that apparatus.

The objects of this invention are:

(1) To provide an improved fuel control system wherein the fuel flow regulating unit acts directly on the fuel supplied by a constant capacity pump to regulate its flow to the engine, rather than acting upon a variable capacity fuel pump to regulate its output.

(2) To provide for an internal combustion engine, an improved fuel control apparatus which will produce a constant engine speed corresponding to the control lever position selected by the operator.

(3) To provide such a control apparatus wherein the maximum safe speed and temperature of the engine will never be exceeded.

(4) To provide such a control which will so function that the engine can be accelerated and decelerated at a maximum rate, corresponding respectively to the maximum temperature permissible ahead of the turbine, and to the minimum fuel flow corresponding to burner blowout conditions. In addition, the fuel flow is never great enough to cause stalling of the compressor.

(5) To provide improved fuel and speed control apparatus for an internal combustion engine employing a plurality of component coordinated hydraulic systems for regulating fuel delivery, said systems being responsive to manual control and to pressure, speed and temperature conditions of the engine.

(6) To provide improved pressure regulating and pressure responsive control elements which may be used in hydraulic apparatus such as mentioned above.

(7) To provide in such apparatus, improved means for closely controlling acceleration and deceleration of the engine, as a function of a pressure responsive system, wherein "hunting" is reduced to a minimum, or eliminated.

With these and other objects in view which may be incident to my improvements, my invention consists in the combination and arrangement of elements hereinafter described and illustrated in the accompanying drawings, in which:

Figure 1 shows, somewhat diagrammatically, an engine suitable for propeller-and-jet propulsion of aircraft, together with its associated fuel flow regulator, fuel pump, manual control lever, and the principal connections therebetween;

Figure 2 shows, also somewhat diagrammatically, a control apparatus embodying the principles of my invention;

Figure 3 is a central vertical section of part of the regulating unit showing the servo valve, speed governor and manual control cam shaft assembly;

Figure 4 is a central vertical section of part of the regulating unit showing the fuel flow regulating valve assembly;

Figure 5 is a fragmentary vertical section along the line 5—5 of Figure 4; and

Figure 6 is a diagram showing certain characteristics of the action of the control mechanism Referring to Figure 1 of the drawings, there are shown, as the principal elements of the engine above referred to: a supporting casing 1, an air inlet 2, a multistage air compressor 3, a compressor rotor shaft 4; one each of a number of combustion chambers 5; one each of a series of combustion nozzles 6, connected respectively to two generally circular fuel manifolds 8 and 9, by means of conduits 10 and 11; a multistage gas turbine 12, a turbine rotor shaft 13, connected to the compressor rotor shaft 4; a tail pipe 14 for discharging exhaust gases from gas turbine 12; a center bearing 15 and end bearings 16 and 17, supported by casing 1; a propeller shaft 18, carrying a propeller 19, and a gear train 20, connecting shafts 4 and 18 for rotating propeller 19 at a speed proportional to engine speed and for operating the fuel pump and other accessories. The construction of a turbo-jet engine used solely for jet propulsion is similar to that of the engine shown in Figure 1, except for the omission of the propeller shaft 18 and corresponding modification of the gear train 20.

A positive displacement, constant capacity fuel pump 21 draws fuel from a supply tank 22 through a conduit 23 and delivers it through a conduit 24 to the fuel flow regulating apparatus diagrammatically indicated at 25 and shown in detail in Figure 2. From fuel regulator 25 the fuel flows through a conduit 26 to a pressure-responsive flow-divider 27, and from thence through conduits 28 and 29 to fuel manifolds 8 and 9, respectively, in the engine. Pump 21 is operated by a drive shaft 30 connected to gear train 20 in the engine, or any other suitable source of power. The fuel regulator 25 acts to vary the quantity of fuel delivered to the engine per unit of time, as required by the operating conditions, and the difference between the fuel delivered by the pump 21 and the quantity required by the engine is by-passed through a conduit 31 to the inlet side of the pump through a relief valve in the fuel regulator 25.

In each of the combustion nozzles 6 there is a series of fixed slots, one of which is indicated at 32, through which fuel enters the nozzles 6 from conduit 10. The fuel flow from the nozzles is directly proportional to the effective area of slots 32 and is a square root function of the drop across the nozzles between the pressure in conduit 10, which is substantially equal to the pressure in conduit 28, and the pressure ($p_2$) in the combustion chamber 5. As it is desired to limit the range of fuel pressure so that its value at maximum fuel flow is less than that corresponding to the square root function of the drop across slots 32, the nozzles 6 are provided with auxiliary slots 7 supplied by manifold 11 connected to the pressure-responsive flow-divider 27 which opens at a predetermined value of the pressure ($p_m$) in conduit 26. In this manner, the pressure ($p_m$) may be maintained sufficiently high to produce satisfactory nozzle discharge without requiring the fuel regulator 25 and pump 21 to operate under unfavorable pressure conditions at maximum flow.

The fuel flow regulator 25, shown diagrammatically in Figure 1, and in detail in Figure 2, is connected by a conduit 33 to a source of compressor inlet pressure ($p_1$) in the engine, and by a conduit 34 to a corresponding source of compressor discharge pressure ($p_2$). As subsequently explained, the fuel regulator 25 is responsive to the pressure differential ($p_2 - p_1$) which is a function of air flow through the engine. The value ($p_2 - p_1$) increases as the engine speed increases and as the altitude of flight, or temperature of entering air decreases, and is also a function of the compressor characteristics.

A main drive shaft 35 in the fuel regulator 25 is driven by the engine at a speed proportional to engine speed and a manual control shaft 36 is rotatable in response to movement of a shaft 37 to which is fixed the engine control lever 38. Control lever 38 is manually operable in reference to a scale 39 on a fixed quadrant 40, the scale 39 being calibrated in terms of engine speed (R. P. M.).

Referring to Figure 2, there is shown, somewhat diagrammatically, an embodiment of my invention, all the principal elements of which are enclosed in a casing 41 having an external connection with conduit 33 for supplying air to the apparatus at the compressor inlet pressure ($p_1$), and with conduit 34, for supplying air to the apparatus at the compressor discharge pressure ($p_2$).

The control apparatus shown in Figure 2 is a self-contained hydraulic system employing the interior of casing 41 as a reservoir 42 which is maintained approximately full of liquid fuel at a pressure ($p_1$) in order to permit the working elements to operate in a lubricating bath. This control apparatus comprises five mechanically and/or hydraulically operated cooperating units as follows:

(1) A by-pass relief valve for regulating the pressure ($p_l$) of the liquid fuel in the conduit 24 on the downstream side of the fuel pump 21.

(2) A main fuel metering valve which varies the flow of fuel to the flow-divider 27 and burner nozzles, as a function of the pressure rise ($p_2 - p_1$) across the compressor 3, to meet the specified conditions of constant engine speed for any given setting of the manual control and of acceleration and deceleration of the engine; the metering valve ports being contoured to give the necessary relation between fuel flow and compressor sensing pressure ($p_2 - p_1$).

(3) A manual control whereby the operator may vary the engine speed as desired throughout its permissible operating range, including a cut-off valve for completely stopping all fuel flow to the engine.

(4) A speed control comprising a servo valve, responsive to a speed governor driven by the engine, which varies the pressure equilibrium on the relief valve (1) above and thereby varies the pressure and therewith the rate of fuel delivered to the engine through the metering valve (2) above. This variation in rate of fuel delivery will result in correction of the engine speed in any desired direction. The speed control system includes a pressure responsive mechanism for immediately varying the fuel pressure on the main metering valve, in accordance with a change in manual control setting, in anticipation of the action of the speed governor on said valve, whereby "hunting" affect of the speed control is eliminated and the engine made more quickly responsive to the manual control.

(5) A thermal control for overriding the manual control as a function of engine temperature. Normally, there is no liquid flow through the thermal control, but when the maximum allowable temperature is exceeded liquid flows through the thermal control and lowers the pressure ($p_b$) on the bypass relief valve which reduces the fuel pump discharge pressure ($p_f$). This reduction of fuel pump discharge pressure reduces the rate of fuel supplied to the engine and results in reduced engine speed and temperature.

Referring particularly to Figure 2, liquid fuel is supplied from fuel supply tank 22 through conduit 23 to fuel pump 21, at a pump inlet pressure ($p_i$), either under a gravity head as shown in Figure 2, or from a booster pump (not shown) between tank 22 and main fuel pump 21. Fuel issuing from pump 21 flows through conduit 24 and branch conduit 41 to a by-pass relief valve 42 which comprises chambers 43 and 44 between which is located a valve seat 45. Cooperating with valve seat 45 is a valve 46 having an integral valve stem 47 slidably mounted in a sleeve 48 fixed to the wall of chamber 43 by a tap bolt 49. Valve 46 is threadedly attached to a piston 50 slidably mounted in a sleeve 51 which is secured by an outer sleeve 52 fixedly mounted in a cylindrical recess 53 in the right end of chamber 44. A plug 54 closes the right end of chamber 45 and forms with the right end of piston 50 a cylindrical space 55 in which is mounted a spring 56 biasing piston 50 toward its seat 45. A conduit 57 leads from space 55 to a conduit 58 which connects with the manual and thermal controls hereinafter described. Chamber 44 is connected by conduit 31 with conduit 23 on the inlet side of pump 21.

From the foregoing description it is clear that valve 46 is subject to the pump delivery pressure ($p_f$) in conduits 24 and 41 and chamber 43. When this pressure ($p_f$) exceeds the pressure in space 55, plus the force of spring 56, valve 50 will open and permit liquid fuel to flow from chamber 43 through chamber 44 and conduit 31 to the inlet side of pump 21. The fuel thus by-passed around the pump will reduce the pressure ($p_f$) in conduit 24 until it balances the pressure in space 55 plus the force of spring 56. As valve 50 will float most of the time just off of its seat 45, guide stem 47 closely fitting in sleeve 48 is provided to steady the motion of valve 50 and prevent minor fluctuations and chattering.

Conduit 24 delivers fuel at pump outlet pressure ($p_f$) to chamber 59 in which is mounted a sleeve 60, the upper end of which forms a seat 61 for a manually operated cut-off valve 62. Mounted on stem 63 of valve 62 are two annular flanges 64 and 65 which reciprocate in cylinders 66 and 67 and serve as guides for the movement of valve 62 and hydraulically balance the valve. Flanges 64 and 65 are provided with gaskets which form fluid-tight joints between the flanges and their cylinders 66 and 67, respectively. The upper end of cylinder 66 and the lower end of cylinder 67 open into a chamber 68 in the upper part of casing 41, and cylinder 67 is vented to cylinder 66 through a passageway 69 in stem 63 of valve 62. A horizontal passage 70 connects chamber 68 with another chamber 71 which is hermetically sealed by a cover plate 72 and gasket 73 held in place by tap bolts 74. Manual control shaft 36 is journalled in the right side wall of chamber 71 and extends into said chamber wherein are located cams 75 and 76, each of which is adjustably mounted on shaft 36 by an integral split collar and bolt (see Fig. 5).

The inner end of shaft 36 carries a crank arm 77 which is adjustably secured to the shaft by a set screw 78, and carries at its other end a pin 79 which extends to the left, at right angles with crank arm 77, and engages valve stem 63 between fixed collars 80 on said stem. The center line of shaft 36 is off-set from the center line of valve stem 63 by the throw of crank arm 77 which is equal to the total vertical travel of valve stem 63 in cylinders 66 and 67. Shaft 36 is rotated 90° by the throw of manual control lever 38, between its 0° position on scale 39, corresponding to minimum engine speed, to its 90° position, corresponding to maximum engine speed, and this 90° rotation of shaft 36 varies the position of valve 62 from its lowest operating position just off of its seat 61 to its highest or full open position. Rotation of manual control lever approximately 5° below its minimum speed (0°) position causes shaft 36, arm 77, and pin 79 to seat valve 62 firmly on its seat 61 which completely cuts off the flow of fuel to the engine, as is hereinafter described.

When valve 62 is in open position (as in Fig. 2), fuel flows through valve chamber 81 and passage 82 to cylinder 83 of main fuel metering valve 84 which reciprocates in a valve sleeve 85 fixedly mounted in cylinder 83. Between cylinder 83 and sleeve 85 are two annular spaces 86 and 87 which are separated from each other by a flange 88 which extends outwardly from sleeve 85 and contacts cylinder 83 with a fluid-tight fit. Upper and lower flanges 89 and 90 similarly fit cylinder 83 and prevent escape of liquid therebetween. A plurality of ports 91 in the upper part of sleeve 85 admit liquid fuel from space 86 into the interior of sleeve 85 and a plurality of ports 92 in the lower part of sleeve 85 permits fuel to flow from the interior of sleeve 85 into space 87 when valve 84 is open, and from thence through conduit 26 to flow-divider 27. As shown in Figure 3, ports 92 have contoured shape, elongated in a vertical direction, and constitute the variable metering orifice of metering valve 84.

Extending upwardly from valve 84 is a reduced portion 93 which is integral with a cylindrical guide member 94 that closely fits in sleeve 85 and serves to guide and steady the movement of valve 84 in said sleeve.

Referring now more particularly to Figure 3, the valve member 84—93—94 has a central, longitudinal bore through which passes a rod 95 having near its lower end an outwardly-extending, integral flange 96 which contacts the lower end of valve 84 and forms a seat therefor. A pair of lock nuts 97 are threaded on the upper end of rod 95 and serve to hold valve member 84—93—94 firmly against flange 96 and thus in fixed relation to rod 95. A spring 98 in a recess in the bottom of valve 84 serves to keep valve member 84—93—94 in contact with lower nut 97 during the assembly of said valve member on said rod.

Threaded on rod 95 above nuts 97 is another lock nut 99 which serves as an adjustable seat for a pair of discs 100 which embrace between them a flexible diaphragm 101. Discs 100 are held firmly against nut 99 by a cylindrical cap member 102 which is threaded over the upper end of rod 95. The lower end of cap member 102 is provided with an outwardly-extending flange 103 which serves as a base for a pressure-responsive bellows 104 whose upper end is attached to a hollow cylindrical plug 105 which is seated in a bore 106 in the top of casing 41. Plug 105 has a depending tubular extension which terminates in an inwardly-projecting flange 107 that serves as a seat for a spring 108 whose upper end bears against a pair of locked nuts 109 threaded on the upper end of cap member 102 and which serve to adjust the compression in spring 108. Seated in a recess in the top of cap member 102 is a light spring 110 whose compression is adjusted by a tap bolt 111 threaded through a cover plate 112 which hermetically seals the upper end of bore 106 and forms the top of a chamber 113 which is connected by conduit 34 to the compressor discharge chamber in engine 1, and receives air under compressor discharge pressure ($p_2$).

Cylinder 83 and sleeve 85 open into a chamber 114 and bore 106 opens into a chamber 115. The outer edge of diaphragm 101 is seated between the adjacent ends of the outer walls of chambers 114 and 115 and hermetically seals these chambers. Chamber 114 is connected by a conduit 116 to chamber 42 and chamber 115 is connected by a conduit 117 to conduit 31 (see Fig. 2). Conduit 117 has a calibrated restriction 119 which serves to regulate the flow of liquid therethrough. A conduit 120 connects conduit 117 with chamber 42 and has a similar restriction 118. From this arrangement, it will be noted that chamber 114 is supplied with liquid fuel, under pump inlet pressure ($p_1$) through conduits 31, 117 and 120, chamber 42 and conduit 116, and that chamber 115 is also supplied with liquid fuel under the same pressure ($p_1$) through conduits 31 and 117. A passage 121 and passage 70 connect chamber 115 with chamber 71 so that the chamber 71 is also supplied with liquid fuel under a pressure ($p_1$).

Seated in the bottom of cylinder 83 is a flanged disc 122 which serves as a base closure of a pressure-responsive bellows 123 whose upper end is closed by a cover 124 threadedly connected to the lower end of rod 95 and secured in adjusted relation to said rod by a lock nut 125. A tubular shim 126 forms the outer wall of a chamber 127 and serves as a seat for valve sleeve 85. Chamber 127 is connected by a drain pipe 128 to conduit 31 so that any liquid fuel that leaks past valve 84 into chamber 127 is returned to conduit 23 on the inlet side of pump 21. Disc 122 is provided with an aperture 129 through which the interior of bellows 123 receives air through conduit 33 from air inlet 2 under a pressure ($p_1$).

Referring now to Figures 2 and 4, it will be noted that the right-hand part of casing 41 is provided with two vertically disposed, cylindrical bores 130 and 131, each in axial alignment with the vertical center lines of cams 76 and 76, respectively. Slidably and rotatably mounted in the upper end of bore 130 is a plunger 132 whose upper end is internally threaded for the reception of the threaded stem 133 of a cam follower 134 which is mounted in plunger 132 and contacts the face of cam 76. Follower 134 has a lateral extension to the right with an aperture for engaging a pin 135 which is fixed in the wall of bore 130 and extends upwardly into chamber 71. Plunger 132 is provided around the periphery of its upper end with a series of gear teeth 136 which are pitched at an angle of approximately 7° with the vertical axis of plunger 132 (see Fig. 5, which is a section along the line 5—5 of Fig. 4). Gear teeth 136 mesh with a worm 137 on the inner end of a shaft 138 rotatably mounted in bore 139 in casing 41. Bore 139 is pitched at an angle of approximately 83° with the vertical axis of plunger 132, so that worm 137 will properly mesh with teeth 136 in plunger 132. The outer end of shaft 138 is somewhat enlarged and provided with threads 140 which engage internal threads in casing 41. The outer end of shaft 138 has a transverse slot 142 for the reception of a screw driver by which shaft 138 can be rotated. A lock nut 143 threaded on threads 140 provides a means for locking shaft 138 in fixed position. When shaft 138 is rotated, it turns plunger 132 about its vertical axis, and since stem 133 of cam follower 134 is prevented from rotating by pin 135, the turning of plunger 132 about its vertical axis causes it to move up or down with reference to cam follower 134 and thus adjusts the position of plunger 132 relative to cam follower 134.

Returning to Figure 4, it will be noted that the lower half of plunger 132 is counterbored to receive a spring 144 which seats at its lower end in an annular cup 145 which in turn rests upon an annular thrust bearing 146 (preferably of carbon). Bearing 146 is supported by a conical washer 147 which rests upon the conical shoulder of a triple-spool servo valve 148. The lower end of servo valve 148 terminates in an enlarged cylindrical portion 149 which is provided at diametrically opposite points in its cylindrical face with two notches 150, each of which receives the lower end of an arm 151 pivoted to lugs 152 on the base of a hollow cylindrical frame 153 of a fly-weight speed governor. The center of base 153 is provided with an elliptical aperture 154 for the reception of an elliptical-shaped neck 155 of a governor drive shaft 35 driven by the engine 1. Shaft 35 is supported by a ball bearing 156 mounted in the bottom of casing 41 and is surrounded by a packing gland 157 to prevent escape of liquid fuel which may leak out from chamber 42 past top guide bearing 158 of shaft 35. The top of shaft 35 is tapped to receive a threaded tap screw 159 which presses a washer 160 against the base 153 and the latter against the shoulder of shaft 35, thereby locking base 153 to said shaft. Arms 151 are enclosed in a hollow cylindrical housing 161 fixed to base 153, and the upper ends of said arms are weighted so that, as they are rotated by shaft 35 and base 153, they move outwardly by centrifugal force in proportion to the speed of rotation, and thereby raise servo valve 148 to which they are connected.

Servo valve 148 is slidably and rotatably mounted in a valve sleeve 162 which is fixedly positioned in bore 130 and held in place by pins 163 at the lower end of said bore. Sleeve 162 is provided with three circumferential grooves 164 on its inner surface which communicate through ports with conduits leading into bore 130. The uppermost groove 164 is connected by a conduit 165 with chamber 59; the middle groove 164 is connected by a conduit 166 with conduit 57; and the lowermost groove 164 is connected by conduits 167 and 168 with conduit 26. Above the uppermost groove 164, sleeve 162 has a port 169 which is connected by a conduit 170 with chamber 42. Between port 169 and the uppermost groove 164 and between each of the grooves 164, sleeve 162 is provided with an external groove having a packing ring to prevent leakage between sleeve 162 and bore 130.

Servo valve 148 is of the triple-spool type, consisting of three cylindrical valve portions accurately fitting the interior of sleeve 162, connected by two rod portions of reduced diameter. The upper end of the top valve portion has a conical shoulder 171 terminating in a small upwardly projecting stem 172 which extends through a central aperture in washer 147, bearing 146 and cup 145 and serves as a centering means for those elements during the rotation of valve 148 about its vertical axis. The top cylindrical portion of valve 148 has a narrow vertical slot which registers with port 169 in sleeve 162 once during each rotation of valve 148. The width of slot 173 is equal to about 10° of the circumference of valve 148, so that the registration of slot 173 with port 169 is only during a period of about one thirty-sixth of the time required for valve 148 to make one complete turn about its axis. During the time slot 173 is in registration with port 169, liquid fuel may flow from chamber 42 through conduit 170, port 169, slot 173 to the annular space between the top of sleeve 162 and washer 147 and from thence past washer 147, bearing 146, cup 145 and plunger 132 into chamber 71. There is a sufficient clearance between the outside of washer 147, bearing 146, cup 145 and plunger 132 and bore 130 to permit this small flow of liquid fuel from chamber 42 to chamber 71. This flow not only serves to lubricate and reduce the friction of rotation between valve 148 and washer 147 and bearing 146, but also equalizes the liquid pressures in chambers 42 and 71.

The middle valve portion of servo valve 148 is provided with two small V-shaped notches 174 in its outer surface, in vertical alignment, as shown in Figures 2 and 4. These notches 174 are of maximum depth and width at their bases and merge with the full diametral surface of valve 148 at their points. When valve 148 is in its neutral position, as shown in Figures 2 and 4, the space between the middle and lowest valve portions of valve 148 is in horizontal alignment with conduit 167; the space between the middle and upper valve portions of valve 148 is in horizontal alignment with the lower end of conduit 165; while the central part of the middle valve portion of valve 148 between notches 174 is in horizontal alignment with conduit 166. When valve 148 is in this neutral position, no flow of liquid fuel can take place past said valve, except the small flow from chamber 42 to chamber 71 through conduit 170 once during each revolution of valve 148, as described above.

Since the width of the middle valve portion of valve 148 between notches 174 is just equal to the width of the groove in sleeve 162 opposite conduit 166, any movement of valve 148 up or down from its neutral position will permit liquid fuel to flow past said valve, first through notches 174, and then through spaces between the middle and upper and lower valve portions of said valve as its vertical movement continues. Thus, when valve 148 moves down from its neutral position, communication is established between conduits 165 and 166, while an upward movement of valve 148 from its neutral position establishes communication between conduits 166 and 167. The vertical position of valve 148 depends upon the balance of vertical forces acting on said valve. These forces are: (1) the hydraulic pressure in chamber 42 acting upwardly on valve 148 and opposed by the hydraulic pressure in chamber 71, acting downwardly; (2) the action of arms 151 of the speed governor which push valve 148 upwardly with an increase in engine speed and downwardly with a decrease of engine speed; and (3) the compression in spring 144 which is varied by the throw of cam 76 on the manual control shaft 36. The compression in spring 144 is also adjusted by worm gear mechanism 136—143, as described herein above.

Fixedly positioned in bore 131 is a sleeve 175 in which is slidably mounted a plunger 176. The bottom of sleeve 175 has a port communicating with conduit 58. The upper part of port 177 is bevelled to form a seat for a ball check valve 178 which is biased toward its seat by a spring 179 interposed between valve 178 and plunger 176. Near its lower end, above valve 178, sleeve 175 has a plurality of ports 180 which communicates with an annular space between sleeve 175 and bore 131, which space is connected by a conduit 181 with conduit 168. The compression of spring 179 determines the pressure in conduit 58 at which valve 178 will open and permit liquid fuel to flow from conduit 58 to conduit 181 and this compression is varied by the throw of cam 75 on manual control shaft 36.

Referring to the right-hand side of Figure 2, it will be noted that casing 41 is provided with a bore 182 in which is fixedly positioned a sleeve 183 having a plunger 184 slidably mounted therein. At the bottom of sleeve 183 is a port 185 which communicates with conduit 57 and serves as a seat for a ball check valve 186 which is biased towards its seat by a spring 187 whose compression is varied by the vertical movement of plunger 184. Plunger 184 is provided with a toothed rack 188 which meshes with a gear pinion 189 mounted on the shaft of a torque motor 190 which is connected by electric wires 191 through an amplifier 192 with a thermo-couple 193 located in the tail pipe 14 of the engine (see Fig. 1), where it is subject to the temperature of the exhaust gases. Amplifier 192 is supplied with an electric current from a battery 194 or other source of electric power. The temperature of the exhaust gases in tail pipe 14 creates an electrical potential in the thermo-couple 193 which causes a current to flow through amplifier 192 where it is amplified and transmitted through wires 191 to torque motor 190.

A rise in temperature causes a current which tends to rotate motor 190 in a clockwise direction which decreases the compression and force of spring 187 on valve 186, and vice versa. Below a maximum safe operating temperature, the position of plunger 184 is such, with respect to the calibration of spring 187, that the force of said spring, plus the pressure ($p_m$) in conduit 181, exceeds the lift on valve 186 of the pressure ($p_s$) in conduit 58, and hence valve 186 remains closed and the pressure ($p_s$) in conduit 58 is determined by the force of spring 179 on valve 178, which in turn is a function of the position of cam 75 as determined by the setting of manual control lever 38. If now the temperature of the exhaust gases in tail pipe 14 should rise above the maximum safe limit, motor 190 will lift plunger 184, reducing the compression and force of spring 187 on valve 186 until the pressure differential $(p_s-p_m)$ between conduits 58 and 181 exceeds the force of spring 187 and valve 185 opens, whereupon the pressure $(p_s)$ in conduit 58 is determined by the action of valve 185 rather than the manually controlled valve 178.

*Operation*

The principles of operation of my improved jet engine control system are as follows:

(1) A positive displacement fuel pump (21) furnishes liquid fuel to the regulator (25) which acts to vary the rate of fuel delivery to the engine as required by the specified operating conditions. The difference between the fuel delivered by the pump and the quantity required by the engine is by-passed to the inlet side of the pump through a pressure-responsive relief valve (42).

(2) The fuel required by the engine to maintain its operating speed, or to meet the specified conditions of acceleration, is metered through a metering valve (84) which is specially contoured (92) to give the necessary relation between fuel pressure and compressor rise or sensing pressure $(p_2-p_1)$.

(3) The pressure drop across the burner nozzles (6) and flow-divider (27) may be variable for a given rate of fuel flow. The flow through the metering valve (84) only is a function of the compressor sensing pressure differential $(p_2-p_1)$, and in case of stopping up of a nozzle or other obstruction to fuel flow, the pressures adjust themselves to maintain the fuel flow at a constant rate corresponding to the speed of the engine and the position of the manual control lever (38).

(4) During steady state (normal), or fixed manual lever position, operation of my control system, the tension of the speed governor spring (144) is substantially constant and is balanced against the thrust due to the rotating governor weights (151). Any slight increase or decrease of engine speed causes the governor servo valve (148) to rise or fall, which upsets the equilibrium of the relief valve (42), and consequently lowers or raises the pressure and therewith the quantity of fuel delivered, per unit of time, to the engine through the metering valve (84). This variation in rate of fuel delivery to the engine will result in correcting its speed in the desired direction.

(5) The movement of the metering valve (84), by the compressor sensing pressure differential $(p_2-p_1)$, simultaneously creates a differential pressure which acts directly upon the governor servo valve (148) in the same direction as the weight arms of the speed governor will act with the change of engine speed resulting from the change in fuel flow due to movement of the metering valve. The effect of this differential pressure acting immediately upon the servo valve, before the weight arms of the speed governor have had time to act, is to anticipate the action of the governor arms. This not only makes the speed of the engine more quickly responsive to movements of the manual control lever, but also steadies the action of the control system by eliminating "hunting" therein.

(6) The metered fuel pressure $(p_m)$, minus the compressor discharge pressure $(p_2)$ into which the fuel is discharged from burner nozzles (6), is a specified function of compressor sensing pressure $(p_2-p_1)$. The fuel pump discharge pressure $(p_f)$ is determined from the equilibrium of the relief valve (42); the servo valve pressure $(p_s)$ is determined from the equilibrium of the check valve 178 (except when valve 186 opens); and the metering head $(p_f-p_m)$ is constant within the variation of the forces of these valve springs (56 and 179) with their displacements.

(7) With the manual control lever (38) in the full open (90°) position and the engine rotating at speeds below full R. P. M., the speed governor will be in the cut-out position, i. e., the servo valve (148) will be displaced a little below the neutral position shown in Figures 2 and 4, so that a restricted flow of fuel occurs through the notches (174) on the middle portion of the servo valve from the pump discharge to the rear side of the relief valve piston (50). This is equivalent to connecting the pump (21) discharge direct to the rear side of the relief valve piston (50) through a restricting bleed hole. If the pump discharge is greater than the quantity of fuel that can be pushed through the metering valve orifice (92) by the metering head $(p_f-p_m)$, then the relief valve 46 will be open to by-pass the excess fuel to the pump inlet (23), otherwise the pump discharge pressure $(p_f)$ will build up and disturb the equilibrium of the relief valve assembly (42).

(8) The metering valve 84 is a balanced valve actuated by the compressor sensing pressure $(p_2-p_1)$ and area of the metering orifice (92) is also a function of the compressor sensing pressure alone, so that to each value of the sensing pressure there corresponds only one value of the orifice area, independent of the fuel pressures.

(9) The quantity of fuel metered by the regulator (25) is given by the equation:

$$F = C_m A_m \rho_f \sqrt{2g \cdot \frac{144}{\rho_f}(p_f-p_m)} \quad (1)$$

where $F$ = Fuel flow in pounds per second
$C_m$ = Discharge coefficient through metering orifice (92)
$A_m$ = Area of metering orifice (92)
$\rho_f$ = Fuel density
$g$ = Acceleration of gravity
$p_f$ = Fuel pressure on discharge side of pump (21) in pounds per square inch
$p_m$ = Metered fuel pressure in pounds per square inch This quantity of fuel is sprayed into the combustion chamber (5) through the burner nozzles (6). Since the pressure in the combustion chamber is equal to the compressor discharge $(p_2)$, the pressure head which forces the fuel through the restrictions due to the flow-divider (27) and the burner nozzles (6) is $(p_m-p_2)$, and if the fuel flow into the combustion chamber is some function ($f$) of this pressure, as determined by the design of the flow-divider, then:

$$F = f(p_m-p_2) \quad (2)$$

Equating Equations 1 and 2, we get:

$$C_m A_m \rho_f \sqrt{2g \cdot \frac{144}{\rho_f}(p_f-p_m)} = f(p_m-p_2)$$

or $$(p_m-p_2) = f\left(C_m A_m \rho_f \sqrt{2g \cdot \frac{144}{\rho_f}(p_f-p_m)}\right) \quad (3)$$

Equation 3 states that the fuel pressure head ($p_m-p_2$) is a function of the area ($A_m$) of the metering valve orifice (92). Since $A_m$ is a function of the compressor sensing pressure ($p_1-p_2$), the fuel pressure head ($p_m-p_2$) is a function of the compressor sensing pressure, controllable for any particular application by the contour of the metering orifice (92).

Since the fuel pressure head ($p_m-p_2$) is dependent on the discharge coefficients and the areas of the nozzle jets, etc., an advantage of my control is that in case of clogging of one or more nozzles (6), which will change the discharge characteristics of the nozzles, the fuel pressure will adjust itself to maintain the fuel flow constant as given by equation 1 above. In so doing, the absolute values ($p_f$) and ($p_m$) will change, but their difference ($p_f-p_m$) will remain constant.

(10) When the speed governor is in cut-out position and the compressor sensing pressure is held constant, the metering head ($p_f-p_m$) is a specified function of the manual control shaft (36) rotation, the shape of the curve describing the specified function being determined by the contour of the cam (75).

(11) The engine speed at which the speed governor cuts in and out (i. e., when servo valve 148 is open or closed) is a specified function of the rotation of manual control shaft (36). The speed setting of the governor in terms of manual shaft (36) rotation is determined by the contour of the cam 76 (see Fig. 5). The servo valve (148) is in "neutral" position at one and only one position of the governor weights (151), and consequently for each position of the manual cam (76) there is a single value of the governor spring (144) tension. Any increase in engine speed will raise the servo valve (148), establishing communication between conduits 166 and 167, and thus placing a restricted by-pass opening in parallel with check valve 178. This permits the liquid fuel behind relief valve piston (50) to escape into the main fuel passage-way (26) downstream from the main fuel metering valve (84), thus reducing the servo valve pressure ($p_s$) until it finally becomes equal to the metered fuel pressure ($p_m$).

(12) The raising of the servo valve (148) and the consequent introduction of a by-pass across the check valve (178) therefore results in a loss of metering head, so that the fuel flow past the main metering valve (84) is no longer sufficient to maintain the required engine power output, and the speed will fall, bringing the governor back to its neutral position.

If this were all that is involved, the speed governor would always bring the engine speed back to the value corresponding to the manual control lever (38) setting. However, the governor servo valve (148) having been returned to neutral, there is nothing to restore the metering head to its required value, and the engine speed will continue to fall until the regulator (25) is in the condition indicated in sub-paragraph (7) above, and the metering head will then build up to normal. The result of the governor action to correct overspeed is therefore an over-correction, resulting in a drop of speed to below the desired value before the desired speed is re-attained. This action of the speed governor is illustrated, in a grossly exaggerated degree for simplicity of illustration, in the diagram in Figure 6 of the drawings, in which the ordinates are engine speed (R. P. M.) and the abscissa are units of time. Assuming that the engine is operating at a given instant of time at a speed of 2500 R. P. M., indicated by the point A in the diagram, and the manual control lever (38) is suddenly shifted to a point on the quadrant scale (39) corresponding to a desired engine speed of 1500 R. P. M., the first effect of the speed governor acting on servo valve (148) is to reduce the fuel flow so that the engine speed falls off as represented by the curve A—B in Figure 6. For the reason just mentioned above, the fall in engine speed will not stop when it first reaches a speed of 1500 R. P. M., indicated by the point B, but continues to fall to some lower speed, represented by point C, whereupon the opposite forces acting through the governor and servo valve (148) causes the engine speed to rise past the desired speed to some higher speed, represented by the point D. The reversing action of the speed governor then reduces the speed again past the desired speed to some lower speed F, and this oscillation in speed continues with progressively reduced amplitude through a series of speeds, G, H, I, etc., alternately higher and lower than the desired speed, until the desired speed is ultimately attained at a point Z. This action of the governor, known as "hunting," is the same for either deceleration of the engine, as indicated by the curve A—B—C—D—E, etc., or for acceleration of the engine, as indicated by the curve A'—B'—C'—D'—E', etc.

In order to eliminate this "hunting" action of the speed governor, I have provided a means for anticipating the action of the speed governor by applying a hydraulic pressure directly upon the servo valve (148) from a movement of the main metering valve (84) in response to a change in the compressor sensing pressure ($p_2-p_1$) which is the first and most immediate effect of a change in engine speed, as mentioned in sub-paragraph (5) above. The result of the action of this anticipating mechanism is to change the engine speed somewhat more gradually from one value to another without overshooting the new desired value, as indicated in the dash line curves A—X and A'—X. This elimination of "hunting" not only greatly steadies the operation of the engine during acceleration and deceleration, but makes the engine much more quickly and accurately responsive to movements of the manual control lever.

Adverting now to a consideration of the mechanism hereinabove described and illustrated in the drawings, the operation of my improved jet engine control system is as follows:

When the engine is operating under steady state normal, or fixed manual control lever position, the servo valve 148 is in neutral position, as shown in Figures 2 and 4, and the fuel pump 21 supplies liquid fuel to the engine 1 through conduit 24, chamber 59, manual cut-off valve 61—62, chamber 81, passage 82, space 86, apertures 91, valve 84, metering orifice 92, conduit 26, flow-divider 27, conduits 28 and 29, and burner nozzles 6 in combustion chamber 5. During steady state operation of the engine, the fuel pressure ($p_f$) in conduit 24, and in passages up to main metering valve 84, is substantially constant and is determined by the degree of opening of bypass relief valve 46, which in turn depends upon the loading of spring 56 and the hydraulic pressure ($p_s$) in chamber 55. The rate of supply or flow of fuel to the engine is determined by the combination of two variable factors: the area ($A_m$) of the metering orifice 92, and the metering pressure or head ($p_f-p_m$), ($p_m$) being the metered fuel pressure in the conduit 26. The area ($A_m$) depends upon the position of the metering valve 84 which is determined by the difference between the compressor inlet pressure ($p_1$) in bellows 123 and in the compressor discharge pressure ($p_2$) in the bellows 104, minus the loading on spring 108, since during steady operation the pressure ($p_1$) in chamber 114 is the same as in chamber 115 and the forces on diaphragm 101 are balanced. Since the difference in pressures ($p_2-p_1$) is the rise across the air compressor and is a measure of the mass air flow through the engine, the loading on spring 108 determines the position of metering valve 84 and the value of $A_m$, at any given value of ($p_2-p_1$). Hence, the adjustment of the tensions in springs 108 and 110, by lock nuts 109 and tap bolt 111, respectively, determines the mixture ratio of the fuel and air supplies of the engine.

Fuel is supplied under pump inlet pressure ($p_1$) from conduit 23 through conduits 31 and 117 and restriction 119 to chamber 115, and also through conduit 120, restriction 118, chamber 42, and passage 116 to chamber 114. From chamber 115, fuel under pressure ($p_1$) also flows through passage 121 to chamber 68 and thence through passage 70 to chamber 71. Fuel under pressure ($p_1$) may also flow from chamber 42, through passage 170, port 169, notch 173 in servo valve 148, and bore 130 to chamber 71. During steady state operation, the pressure ($p_1$) in all these communicating chambers is the same, but this is not the case during acceleration or deceleration, or other variable conditions of operation, as hereinafter explained.

As indicated above, the pump discharge pressure ($p_t$) depends upon the servo pressure ($p_s$) in chamber 55 of relief valve unit 42, and so long as servo valve 148 is exactly in its neutral position, as shown in Figures 2 and 4, its middle valve portion completely cuts off communication between conduits 165, 166 and 167 and the pressure ($p_s$) in conduit 57 and chamber 55 is constant. If now the operator advances manual control lever 38 to a higher speed index 39 on quadrant 40, shaft 36, which is connected to shaft 37, rotates cam 76 in a clockwise direction which pushes plunger 132 down and increases the compression and force of spring 144 on servo valve 148. This increase in force of spring 144 pushes servo valve 148 down, in opposition to the action of arms 151, and establishes communication between conduits 165 and 166 and permits fuel under pressure ($p_t$) to flow from chamber 59 through conduits 165, 166 and 57 to chamber 55 in relief valve unit 42. The resulting increase in pressure ($p_s$) in chamber 55 moves valve 46 towards its seat 45, reducing the flow of by-passed fuel through conduit 41, chambers 43 and 44 and conduit 31, and thereby increasing the pressure ($p_t$) and flow of fuel through conduit 24, metering valve 84, orifice 92, conduit 26, flow-divider 27 and conduits 28 and 29 to burner nozzles 6.

With increased fuel flow, the engine speed increases, with proportionate increase in mass air flow and compressor rise ($p_2-p_1$), (compressor sensing pressure). This increase in compressor rise ($p_3-p_1$), acting through bellows 104 and 123, lowers valve 84 in opposition to spring 108, and increases the area ($A_m$) of orifice 92 to correspond with the increased fuel flow from conduit 24 to valve 84. The lowering of valve 84 expands chamber 115, reducing the pressure therein, and compresses the liquid fuel in chamber 114. This increase in pressure ($p_1$) in chamber 114 is transmitted through passage 116 to chamber 42 where it acts upwardly on the bottom disc 149 of servo valve 148, raising said valve until the increased compression in spring 144 balances the upward hydraulic thrust and the valve 148 comes to rest momentarily in its new position, as determined by the equilibrium of forces acting thereon at the moment.

At the same time, owing to the closing of relief valve 46, there is a simultaneous drop in inlet pressure ($p_1$) in conduit 31 which is transmitted through conduit 117 and restriction 119 to chamber 115. This drop in pressure ($p_1$) in chamber 115 is transmitted through passage 121, chamber 68 and passage 70 to chamber 71, where it further unbalances the hydraulic pressures acting on the top and bottom of servo valve 148 and temporarily increases the upward thrust thereon.

Meanwhile, the increase in pressure in chamber 42 (transmitted from chamber 114) causes liquid fuel to flow through restriction 118 and conduit 120 back to conduit 117, where it builds up the pressure in conduit 117 until it equals the pressure in chamber 42. The increasing pressure in conduit 117 is transmitted through restriction 119 until the pressure in chamber 115 equals the pressure in conduit 117, at which time the pressures in chambers 114 and 115 again become equal. The time required for the pressures in chambers 114 and 115 to become equal depends upon the relative and absoulte sizes of restrictions 118 and 119. As long as the pressure in chamber 42 exceeds the pressure in chamber 71, which is always equal to that in chamber 115, fuel will also flow from chamber 42 through conduit 170, port 169, notch 173 in servo valve 148, and bore 130 to chamber 71. This flow is, however, restricted by notch 173 in proportion to the speed of rotation of servo valve 148, which is revolved by its connection to the speed governor. Since notch 173 registers with port 169 only once per revolution of valve 148, and then only for a very small fraction of each revolution, it is clear that the flow from chamber 42 to chamber 71 will be decreased as the speed of rotation of valve 148 decreases. The slower the flow of fuel from chamber 42 to chamber 71, the longer the upward thrust of the hydraulic pressure in chamber 42 acts to raise servo valve 148 in anticipation of the action of arms 151 with increasing speed of the engine and governor. Hence, proportioning the flow of fuel from chamber 42 to chamber 71 in accordance with engine and governor speed helps to stabilize the action of the speed governor and servo valve and prevent "hunting" of the control system.

As the engine speed increases with increased fuel flow as described above, the weight arms 51 of the speed governor move outwardly by centrifugal force, in proportion to the increase in engine speed, and in so doing raise servo valve in opposition to the force of spring 144 until these forces balance, whereupon servo valve again returns to its neutral position and a state of steady engine operation at the new higher speed ensues.

When shaft 36 is rotated by moving manual control lever 38 to the right to a higher speed setting, cam 75 is rotated in a clockwise direction which pushes plunger 176 down and increases the compression and force of spring 179 on ball check valve 178. This increase in the force of spring 179 on valve 178 enables the valve to hold the higher pressure ($p_s$) in conduits 58 and 57 which has been created by the downward movement of servo valve 148 as just described above. When the increasing pressure ($p_s$) in conduits 57 and 58 reaches a value exceeding the increased force of spring 179, valve 178 opens and permits fuel to flow from conduits 57 and 58 through conduits 181 and 168 into conduit 26, until the pressure ($p_s$) in conduits 57 and 58 falls to a value below the force of spring 179 when valve 178 closes. Since the pressure in conduits 181 and 168 is that of the metered fuel ($p_m$), it is clear that valve 178 will maintain a pressure differential of ($p_s - p_m$), between conduits 57—58 and conduits 181—168, equal to the loading of spring 179, as determined by the position of cam 75 and plunger 176, as long as servo valve prevents communication between conduits 166 and 167. Thus, valve 178, by maintaining a definite relation between the servo pressure ($p_s$) and the metered fuel pressure ($p_m$), serves to keep the pump discharge pressure ($p_f$) in definite relationship with the metered fuel pressure ($p_m$), since the pump discharge pressure ($p_f$) is a definite function of the servo pressure ($p_s$) through the action of relief valve 42.

With the engine in a state of steady operation, when manual control lever is moved to the left to a lower speed position, cam 76 will be rotated in a counter-clockwise direction which reduces the throw of the cam and permits plunger 132 to be raised by spring 144. This decreases the compression and force of spring 144 on servo valve 148 which permits arms 151 of the speed governor to push servo valve 148 up, establishing communication between 166 and 167. Liquid fuel at a pressure ($p_s$) now flows from chamber 55 through conduits 57, 166, 167 and 168 to conduit 26 wherein the pressure is ($p_m$). This flow reduces the pressure ($p_s$) in chamber 55 which permits relief valve 46 to open wider and by-pass more fuel around pump 21, with resulting reduction in the pump discharge pressure ($p_f$) and fuel flow to metering valve 84. Accompanying the reduction in pump discharge pressure ($p_f$) and fuel flow to valve 84, are actions throughout the regulator 25 in the opposite direction from those described above for an increase in pump discharge pressure ($p_f$) and fuel flow to valve 84, all of which result in a reduced fuel supply to the burner nozzles 6 and a corresponding reduction in speed of the engine until the control system again becomes balanced and steady operation of the engine at the desired reduced speed ensues.

With the manual control lever 38 in any fixed position, the corresponding speed of the engine will always remain constant. Thus, if for any reason there should occur an undesired increase in engine speed, the accompanying increase in compressor rise ($p_2 - p_1$), acting through bellows 104 and 123 will at once depress valve 84 which will immediately increase the hydraulic pressure in chamber 114 and decrease the pressure in chamber 115. This pressure differential, transmitted instantly to chambers 42 and 71, respectively, will immediately raise servo valve 184, which will reduce the pressure ($p_s$) in chamber 55, open relief valve 46, reduce the pump discharge pressure ($p_f$) in conduit 24, and reduce the fuel flow to the engine until its speed falls off to that corresponding to the setting of control lever 38. Before the pressure differential in chambers 114 and 115 is equalized through restrictions 118 and 119, the upward thrust of weight arms 151 of the speed governor will maintain servo valve 148 in raised position until the falling speed of the engine again reaches the desired speed, corresponding to the position of manual control lever 138, whereupon servo valve 148 will return to its neutral position and the engine will thereupon continue to rotate at the desired speed in a state of steady operation. Conversely, if an undesired decrease in engine speed should occur, the reverse action of the above-mentioned elements will automatically bring the engine up to the desired speed corresponding to the position of manual control lever 138.

Valve 186 of the thermal override control remains seated at all times unless the temperature in the tail pipe 14 exceeds the prescribed maximum safe limit and the thermal override control has no effect upon the regulator 25. Whenever the temperature in the tail pipe exceeds the prescribed maximum safe limit, torque motor 190 raises plunger 184 and reduces the force of spring 187 upon ball check valve 186, whereupon valve 186 opens and permits liquid fuel to flow from conduit 58 into conduit 181, regardless of the action of valve 178. This flow reduces the pressure ($p_s$) in chamber 55 and permits relief valve 46 to open wider and reduce the pump discharge pressure ($p_f$) and the flow of fuel to metering valve 84, which in turn reduces the flow of fuel to the engine and the speed of the engine. The reduction in engine speed reduces the temperature in the tail pipe 14 until it reaches the maximum safe limit, whereupon torque motor 190 moves plunger 184 down and valve 186 closes. Thus, the temperature of the engine can never exceed a prescribed safe limit regardless of the operation of the manual control lever 38.

While I have shown and described the preferred embodiment of my invention, I do not limit it to the constructional details disclosed by way of illustration, as these may be changed and modified by those skilled in the art, without departing from the spirit of my invention nor exceeding the scope of the appended claims.

I claim:

1. In a fuel supply system for an internal combustion engine, a constant capacity fuel pump, driven by the engine, for supplying fuel to said engine, a by-pass relief valve around said pump for varying the delivery of said pump, first means, responsive to engine speed and to the rate of mass air flow through said engine, for varying the opening of said valve, and means, including said first means, for automatically regulating the flow of fuel from said pump to said engine in accordance with predetermined engine operating requirements which are affected by said speed and rate of air flow.

2. For an internal combustion engine having an air compressor for supplying air thereto, a fuel supply system comprising: a manual control means, a constant capacity fuel pump, driven by the engine, for supplying fuel thereto, a by-pass relief valve around said pump for varying its delivery, and means, responsive to said manual control means, said engine speed and the rate of mass air flow through said engine, and acting on said valve, for automatically regulating the flow of fuel from said pump to said engine, so as to produce a constant steady state engine speed corresponding to the position of said manual control means, under varying engine operating conditions which affect said speed and rate of air flow.

3. In a fuel supply system for an internal combustion engine, having a manual control, a constant capacity fuel pump, driven by the engine, for supplying fuel to the engine, a by-pass relief valve around said pump for varying the delivery of said pump, and means, responsive to said manual control, said engine speed, and to the rate of mass air flow through said engine, and acting on said valve, for automatically regulating the flow of fuel from said pump to said engine, so as to vary the steady state engine speed in proportion to the movement of said manual control means, under varying engine operating conditions which affect said speed and rate of air flow.

4. A fuel control system according to claim 1, which includes means for preventing the speed and temperature of the engine from exceeding predetermined, maximum safe limits.

5. In a fuel supply system for an internal combustion engine, having a manual control, a constant capacity fuel pump, driven by the engine, for supplying fuel to the engine, a by-pass relief valve around said pump for varying the delivery of said pump, and means, responsive to the manual control, to engine speed, and to a pressure and temperature in said engine, and acting on said valve, for automatically regulating the flow of fuel from said pump to said engine in accordance with variations in said pressure, speed and temperature conditions of the engine.

6. In a fuel supply system for an internal combustion engine, having a manual control means, a constant capacity fuel pump, driven by the engine, for supplying fuel to the engine, a by-pass relief valve around said pump for varying the delivery of said pump, and means, responsive to said manual control and to pressure, speed and temperature conditions of the engine and acting on said valve, for automatically regulating the flow of fuel from said pump to said engine in accordance with predetermined engine operating requirements which are affected by said conditions.

7. A fuel control system according to claim 2, wherein the fuel flow regulating means comprises a plurality of component, coordinated hydraulic systems, respectively responsive to said speed and rate of air flow.

8. A fuel control system according to claim 3, wherein the fuel flow regulating means comprises a plurality of component, coordinated hydraulic systems, respectively responsive to said manual control, speed and rate of air flow.

9. A fuel control system according to claim 5, wherein the fuel flow regulating means comprises a plurality of component, coordinated hydraulic systems, respectively responsive to said speed, pressure and temperature.

10. A fuel control system according to claim 6, wherein the fuel flow regulating means comprises a plurality of component, coordinated hydraulic systems, respectively responsive to said manual control, pressure, speed and temperature.

11. A fuel regulating system according to claim 1, wherein the fuel flow regulating means includes means for selectively changing the speed of the engine and means to prevent "hunting" of said regulating means for the new selected speed.

12. In a fuel supply system for an internal combustion engine, having a manual control means, a constant capacity fuel pump, driven by the engine, for supplying fuel to the engine, a by-pass relief valve around said pump for varying the delivery of said pump and means, responsive to the manual control and to variations in pressure, speed and temperature conditions of the engine, for acting on said valve to automatically regulate the flow of fuel from said pump to said engine in accordance with predetermined engine operating requirements which are affected by said conditions.

13. A fuel control system according to claim 12, wherein the fuel flow regulating means comprises a plurality of component, coordinated hydraulic systems, each respectively responsive to pressure, speed and temperature conditions of the engine.

14. A fuel control system of a turbojet engine having an incorporated air compressor whose operating characteristics condition operating characteristics of said engine, comprising: a pump for supplying fuel under pressure to the engine; a fuel metering valve, responsive to the difference in pressure between the inlet and outlet of said compressor, for regulating the entire flow of fuel from said pump to said engine in accordance with the flow of air through said compressor; and means for automatically varying the pressure of the fuel on the upstream side of the metering valve in accordance with the speed of the engine, whereby said fuel flow is varied in accordance with said speed.

15. A fuel control system of a turbojet engine having an incorporated air compressor whose operating characteristics condition operating characteristics of said engine, comprising: a pump for supplying fuel under pressure to the engine; a fuel metering valve, responsive to the difference in pressure between the inlet and outlet of said compressor, for regulating the entire flow of fuel from said pump to said engine in accordance with the flow of air through said compressor; and means for automatically limiting the maximum pressure of the fuel on the upstream side of the metering valve in accordance with a selected maximum temperature of the engine exhaust gases, whereby the temperature of the engine never exceeds said selected temperature.

16. A fuel control system of a turbojet engine having an incorporated air compressor whose operating characteristics condition operating characteristics of said engine, comprising: a pump for supplying fuel under pressure to the engine; a fuel metering valve, responsive to the difference in pressure between the inlet and outlet of said compressor, for regulating the entire flow of fuel from said pump to said engine in accordance with the flow of air through said compressor; and a movable manual control means for varying said fuel flow by varying the pressure of the fuel on the upstream side of the metering valve in accordance with the movement of said control means, so that the speed of the engine is responsive to the movement of said manual control means.

17. A fuel control system for an internal combustion engine having an air compressor, comprising a pump for supplying fuel to the engine, a fuel metering valve, responsive to the pressure rise across the compressor, for regulating the entire flow of fuel from said pump to said engine in accordance with the flow of air through said compressor, and means, including a manual control, for varying the pressure of the fuel on the upstream side of the metering valve and thereby varying said fuel flow in accordance with the speed of the engine and the movement of said manual control.

18. A fuel control system according to claim 17, which includes means for varying said fuel flow by varying the pressure of the fuel on the upstream side of the metering valve in accordance with the temperature of the engine exhaust gases whereby said temperature never exceeds a predetermined safe limit.

19. A fuel control system for an internal combustion engine having an air compressor, comprising a pump for supplyig fuel to the engine, a fuel metering valve for regulating the entire fuel flow from said pump to said engine, means for varying the opening of said valve in proportion to the pressure rise across the compressor, and means, including a manual control, for varying the pressure of the fuel on the upstream side of said valve and thereby varying said fuel flow in accordance with the speed of the engine and the movement of said manual control.

20. A fuel control system according to claim 19, which includes means for varying the pressure of the fuel on the upstream side of the metering valve and thereby varying said fuel flow in accordance with the temperature of the engine exhaust gases whereby said temperature never exceeds a predetermined safe limit.

21. A fuel control system for an internal combustion engine having a series of burner nozzles, comprising a pump for supplying fuel to the engine through said nozzles, means for automatically varying the fuel pressure on the upstream side of said nozzles inversely with the actual total flow area therethrough at all times, whereby the total fuel flow therethrough is always maintained at a selected rate to meet engine operating requirements, irrespective of variations in the flow areas through individual nozzles due to clogging thereof.

22. A fuel control system for an internal combustion engine comprising a pump for supplying fuel to the engine, a movable manual control, and means, responsive to the movement of said manual control and to pressure, speed and temperature conditions in said engine, for automatically regulating the pressure and flow of fuel from said pump to said engine in accordance with said pressure, speed and temperature conditions, and in proportion to the movement of said manual control, thereby producing a constant steady state engine speed corresponding to the position of said manual control, under varying engine pressure and temperature conditions.

23. A fuel control system for an internal combustion engine comprising: a pump for supplying fuel to the engine, a manual control; and means for automatically regulating the pressure and flow of fuel from said pump to said engine in accordance with pressure, speed and temperature conditions of the engine, and in proportion to the movement of said manual control, thereby producing a constant steady state engine speed corresponding to the position of said manual control, under varying engine operating conditions; said fuel flow regulating means including means for selectively changing the speed of the engine, and means for preventing "hunting" of said regulating means for the new selected speed.

24. A fuel control system according to claim 22, wherein the fuel flow regulating means comprises a plurality of independent, coordinated hydraulic systems, each respectively responsive to said pressure, speed and temperature conditions.

25. A speed control system for an internal combustion engine comprising a manual control lever, a pump for supplying fuel to the engine, means, responsive to the movement of said control lever, for automatically regulating the pressure and flow of fuel from said pump to said engine so as to produce a constant engine speed corresponding to the position of said control lever under varying engine operating conditions, and means for preventing "hunting" of said regulating means when the engine speed is changed by movement of said control lever.

26. A speed control system for an internal combustion engine having an air compressor, comprising a movable manual control lever, a pump for supplying fuel to the engine, a centrifugal speed governor driven by the engine, means, responsive to the movement of said manual control lever and to the action of said governor, for automatically regulating the pressure and flow of fuel from said pump to said engine to produce a constant engine speed corresponding to the position of said control lever, and means, responsive to the difference in pressure between the inlet and outlet of said compressor, for anticipating the action of said governer, whereby change of engine speed is made more quickly responsive to movement of said control lever and "hunting" of said regulating means is prevented.

27. A fuel and speed control apparatus, for a turbo-jet engine having an air compressor and a pump for supplying fuel to said engine; comprising: a manual control lever and a fuel regulating system responsive to said control lever for controlling the delivery of fuel from said pump to said engine, said system having means, including a metering orifice, for automatically regulating the fuel flow to said engine so as to produce a constant, predetermined, steady state engine speed corresponding to each position of said manual control lever, under variable engine operating conditions; said regulating means including an all-speed governor adapted to vary the metering head across said orifice in accordance with engine speed and means, responsive to the pressure rise across said compressor and operatively associated with said governor, for stabilizing the action of said governor.

28. A fuel and speed control apparatus for a turbo-jet engine having an air compressor, a tail pipe, and a pump for supplying fuel to said engine; comprising: a manual control lever and a fuel regulating system for controlling the delivery of fuel from said pump to said engine; said system comprising a fuel metering orifice whose area is varied in accordance with the pressure rise across said compressor; and means for varying the metering head across said orifice in accordance with the position of said lever, and during steady state engine operation, in accordance with engine speed.

29. A control apparatus according to claim 28, including an all-speed governor driven by said engine, and means, responsive to the pressure rise across said compressor, for anticipating the action of said governor in response to changes in engine speed and thereby stabilize said action.

30. A fuel and speed control apparatus for a turbo-jet engine having an air compressor, a tail pipe, and a pump for supplying fuel to said engine; comprising: a manual control lever and a fuel regulating system for controlling the delivery of fuel from said pump to said engine; said system comprising a fuel metering orifice whose area is varied in accordance with the pressure rise across said compressor; and means for varying the metering head across said orifice in accordance with the position of said lever and in accordance with the temperature of the exhaust gases in said tail pipe.

31. A fuel and speed control apparatus for a turbo-jet engine having an air compressor, a tail pipe, and a pump for supplying fuel to said engine; comprising: a manual control lever and a fuel regulating system for controlling the delivery of fuel from said pump to said engine; said system comprising a fuel metering orifice whose area is varied in accordance with the pressure rise across said compressor; and means for varying the metering head across said orifice in accordance with the position of said lever and the temperature of the exhaust gases in said tail pipe, and during steady state engine operation, in accordance with engine speed.

32. A fuel and speed control apparatus for an internal combustion engine having an air compressor and a pump for supplying fuel to said engine, comprising: a fuel metering valve, responsive to the compressor sensing pressure, for regulating the fuel flow from said pump to said engine, means for controlling the metering head across said valve in accordance with engine speed, and means responsive to said sensing pressure for anticipating and stabilizing the action of said controlling means in response to changes in engine speed.

33. A control apparatus according to claim 32, wherein said anticipating and stabilizing means is responsive to the rate of change in said sensing pressure.

34. A control apparatus according to claim 33, wherein the action of said anticipating and stabilizing means is proportional to the rate of change in said sensing pressure.

References Cited in the file of this patent

UNITED STATES PATENTS

| Number | Name | Date |
|---|---|---|
| 2,136,959 | Winfield | Nov. 15, 1938 |
| 2,223,381 | Mock | Dec. 3, 1940 |
| 2,227,267 | Lozivit | Dec. 31, 1940 |
| 2,374,844 | Stokes | May 1, 1945 |
| 2,404,428 | Bradbury | July 23, 1946 |
| 2,407,115 | Udale | Sept. 3, 1946 |
| 2,412,289 | Pugh et al. | Dec. 10, 1946 |
| 2,422,808 | Stokes | June 24, 1947 |
| 2,438,663 | Greenland | Mar. 30, 1948 |
| 2,447,263 | Mock | Aug. 17, 1948 |
| 2,457,595 | Orr | Dec. 28, 1948 |
| 2,469,678 | Wyman | May 10, 1949 |
| 2,531,780 | Mock | Nov. 28, 1950 |

FOREIGN PATENTS

| Number | Country | Date |
|---|---|---|
| 560,196 | Great Britain | Mar. 24, 1944 |
| 580,149 | Great Britain | Aug. 8, 1946 |
| 603,884 | Great Britain | June 24, 1948 |

Disclaimer 2,688,229.—*Leighton Lee, II*, Rocky Hill, Conn. FUEL AND SPEED CONTROL FOR INTERNAL COMBUSTION ENGINES. Patent dated Sept. 7, 1954. Disclaimer filed July 3, 1961, by the assignee, *Chandler Evans Corporation.*

Hereby enters this disclaimer to claims 2, 3, 7, 8, 9, 13, and 22 of said patent.
[*Official Gazette August 15, 1961.*]